(12) United States Patent
Eryurek et al.

(10) Patent No.: US 7,010,459 B2
(45) Date of Patent: Mar. 7, 2006

(54) PROCESS DEVICE DIAGNOSTICS USING PROCESS VARIABLE SENSOR SIGNAL

(75) Inventors: Evren Eryurek, Minneapolis, MN (US); Kadir Kavaklioglu, Eden Prairie, MN (US); Steven R. Esboldt, Edina, MN (US)

(73) Assignee: Rosemount Inc., Eden Prairie, MI (US)

( * ) Notice: Subject to any disclaimer, the term of this patent is extended or adjusted under 35 U.S.C. 154(b) by 135 days.

(21) Appl. No.: 10/455,815

(22) Filed: Jun. 5, 2003

(65) Prior Publication Data

US 2004/0024568 A1 Feb. 5, 2004

Related U.S. Application Data

(63) Continuation-in-part of application No. 09/344,631, filed on Jun. 25, 1999, now Pat. No. 6,601,005.

(51) Int. Cl.
G06F 11/30 (2006.01)

(52) U.S. Cl. .................................. 702/182; 700/174
(58) Field of Classification Search ................ 702/45, 702/55, 69, 104, 105, 183, 191, 195, 182; 73/1.69, 861.354, 861.355, 861.356, 861.357, 73/861.22; 340/606
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,855,858 A | 12/1974 | Cushing | 73/194 EM |
| 3,948,098 A * | 4/1976 | Richardson et al. | 73/861.24 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Tsipouras | 73/362 |
| 4,122,719 A | 10/1978 | Carlson et al. | 73/342 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,459,858 A * | 7/1984 | Marsh | 73/861.12 |

(Continued)

FOREIGN PATENT DOCUMENTS

CA 999950 11/1976

(Continued)

OTHER PUBLICATIONS

U. S. Appl. No. 10/893,144, filed Jul. 2004, Brown et al.

(Continued)

*Primary Examiner*—Marc S. Hoff
*Assistant Examiner*—Mohamed Charioui
(74) *Attorney, Agent, or Firm*—Westman, Champlin & Kelly, P.A.

(57) ABSTRACT

A diagnostic device for use in a process control system receives a sensor signal related to a process variable of a process sensed by a process variable sensor. A signal preprocessor provides a sensor power signal output as a function of a frequency distribution of power in the sensor signal. A process condition is determined based upon the sensor power signal.

41 Claims, 9 Drawing Sheets

U.S. PATENT DOCUMENTS

| | | | |
|---|---|---|---|
| 4,463,612 A * | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A * | 4/1994 | Matsumoto et al. | 700/287 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/22 |
| 5,489,831 A | 2/1996 | Harris | 318/701 |
| 5,495,769 A | 3/1996 | Broden et al. | 73/718 |
| 5,510,799 A | 4/1996 | Wishart | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,672,247 A | 9/1997 | Pangalos et al. | 162/65 |

| | | | |
|---|---|---|---|
| 5,675,504 A | 10/1997 | Serodes et al. ............. 364/496 |
| 5,675,724 A | 10/1997 | Beal et al. ............. 395/182.02 |
| 5,680,109 A | 10/1997 | Lowe et al. ................ 340/608 |
| 5,700,090 A | 12/1997 | Eryurek ...................... 374/210 |
| 5,703,575 A | 12/1997 | Kirkpatrick ............ 340/870.17 |
| 5,704,011 A | 12/1997 | Hansen et al. ................. 395/22 |
| 5,705,754 A * | 1/1998 | Keita et al. ............ 73/861.357 |
| 5,705,978 A | 1/1998 | Frick et al. ................. 340/511 |
| 5,708,211 A | 1/1998 | Jepson et al. ............ 73/861.04 |
| 5,708,585 A | 1/1998 | Kushion .............. 364/431.061 |
| 5,710,370 A | 1/1998 | Shanahan et al. ............. 73/1.35 |
| 5,710,708 A | 1/1998 | Wiegand ................ 364/470.1 |
| 5,713,668 A | 2/1998 | Lunghofer et al. .......... 374/179 |
| 5,719,378 A | 2/1998 | Jackson, Jr. et al. ........ 219/497 |
| 5,736,649 A | 4/1998 | Kawasaki et al. ........ 73/861.23 |
| 5,741,074 A | 4/1998 | Wang et al. ................. 374/185 |
| 5,742,845 A | 4/1998 | Wagner ...................... 395/831 |
| 5,746,511 A | 5/1998 | Eryurek et al. ................. 374/2 |
| 5,747,701 A * | 5/1998 | Marsh et al. ............ 73/861.23 |
| 5,752,008 A | 5/1998 | Bowling ...................... 395/500 |
| 5,764,539 A | 6/1998 | Rani ........................... 364/557 |
| 5,764,891 A | 6/1998 | Warrior ................... 395/200.2 |
| 5,781,024 A | 7/1998 | Blomberg et al. ........... 324/763 |
| 5,781,878 A | 7/1998 | Mizoguchi et al. .......... 701/109 |
| 5,790,413 A * | 8/1998 | Bartusiak et al. ........... 700/174 |
| 5,801,689 A | 9/1998 | Huntsman ................... 345/329 |
| 5,805,442 A | 9/1998 | Crater et al. ................. 364/138 |
| 5,817,950 A | 10/1998 | Wiklund et al. ......... 73/861.66 |
| 5,828,567 A | 10/1998 | Eryurek et al. ................ 700/79 |
| 5,829,876 A | 11/1998 | Schwartz et al. ................ 374/1 |
| 5,848,383 A | 12/1998 | Yunus ........................ 702/102 |
| 5,854,993 A | 12/1998 | Grichnik ...................... 702/54 |
| 5,859,964 A | 1/1999 | Wang et al. ........... 395/185.01 |
| 5,869,772 A * | 2/1999 | Storer ...................... 73/861.24 |
| 5,876,122 A | 3/1999 | Eryurek ...................... 374/183 |
| 5,880,376 A | 3/1999 | Sai et al. ................. 73/861.08 |
| 5,887,978 A | 3/1999 | Lunghofer et al. .......... 374/179 |
| 5,908,990 A | 6/1999 | Cummings ............... 73/861.22 |
| 5,923,557 A | 7/1999 | Eidson ................. 364/471.03 |
| 5,924,086 A | 7/1999 | Mathur et al. ................. 706/25 |
| 5,926,778 A | 7/1999 | Poppel ....................... 702/130 |
| 5,934,371 A * | 8/1999 | Bussear et al. ................ 166/53 |
| 5,936,514 A | 8/1999 | Anderson et al. ...... 340/310.01 |
| 5,940,290 A | 8/1999 | Dixon ........................ 364/138 |
| 5,956,663 A | 9/1999 | Eryurek ...................... 702/183 |
| 5,970,430 A | 10/1999 | Burns et al. ................. 702/183 |
| 6,002,952 A * | 12/1999 | Diab et al. ................... 600/310 |
| 6,014,612 A * | 1/2000 | Larson et al. ............... 702/183 |
| 6,014,902 A | 1/2000 | Lewis et al. ............. 73/861.12 |
| 6,016,523 A | 1/2000 | Zimmerman et al. ......... 710/63 |
| 6,016,706 A | 1/2000 | Yamamoto et al. ................ 9/6 |
| 6,017,143 A | 1/2000 | Eryurek et al. ................ 700/51 |
| 6,023,399 A | 2/2000 | Kogure ........................ 361/23 |
| 6,038,579 A | 3/2000 | Sekine ........................ 708/400 |
| 6,045,260 A | 4/2000 | Schwartz et al. ............ 374/183 |
| 6,046,642 A | 4/2000 | Brayton et al. .............. 330/296 |
| 6,047,220 A | 4/2000 | Eryurek ....................... 700/28 |
| 6,047,222 A | 4/2000 | Burns et al. ................... 700/79 |
| 6,052,655 A | 4/2000 | Kobayashi et al. .......... 702/184 |
| 6,061,603 A | 5/2000 | Papadopoulos et al. ....... 700/83 |
| 6,119,047 A | 9/2000 | Eryurek et al. ................ 700/28 |
| 6,119,529 A * | 9/2000 | Di Marco et al. ........ 73/861.68 |
| 6,139,180 A | 10/2000 | Usher et al. .................... 374/1 |
| 6,151,560 A | 11/2000 | Jones ........................... 702/58 |
| 6,182,501 B1 | 2/2001 | Furuse et al. .............. 73/49.2 |
| 6,192,281 B1 | 2/2001 | Brown et al. ................. 700/2 |
| 6,195,591 B1 | 2/2001 | Nixon et al. ................... 700/2 |
| 6,199,018 B1 | 3/2001 | Quist et al. ................... 702/34 |
| 6,209,048 B1 | 3/2001 | Wolff .......................... 710/62 |
| 6,236,948 B1 | 5/2001 | Eck et al. .................... 702/45 |
| 6,263,487 B1 | 7/2001 | Stripf et al. .................... 717/1 |
| 6,272,438 B1 | 8/2001 | Cunningham et al. ........ 702/56 |
| 6,289,735 B1 | 9/2001 | Dister et al. .................. 73/579 |
| 6,298,377 B1 | 10/2001 | Hartikainen et al. ........ 709/223 |
| 6,307,483 B1 | 10/2001 | Westfield et al. ...... 340/870.11 |
| 6,311,136 B1 * | 10/2001 | Henry et al. ................... 702/45 |
| 6,317,701 B1 | 11/2001 | Pyotsia et al. .............. 702/188 |
| 6,327,914 B1 | 12/2001 | Dutton ................. 73/861.356 |
| 6,360,277 B1 | 3/2002 | Ruckley et al. ................ 9/250 |
| 6,370,448 B1 | 4/2002 | Eryurek ..................... 700/282 |
| 6,377,859 B1 | 4/2002 | Brown et al. ................. 700/79 |
| 6,396,426 B1 | 5/2002 | Balard et al. ............... 341/120 |
| 6,405,099 B1 | 6/2002 | Nagai et al. ................ 700/159 |
| 6,425,038 B1 | 7/2002 | Sprecher ..................... 710/269 |
| 6,473,656 B1 | 10/2002 | Langels et al. ............... 700/17 |
| 6,480,793 B1 | 11/2002 | Martin ........................ 702/45 |
| 6,492,921 B1 | 12/2002 | Kunitani et al. ............ 341/118 |
| 6,546,814 B1 | 4/2003 | Choe et al. ............ 73/862.08 |
| 2002/0013629 A1 | 1/2002 | Nixon et al. |
| 2002/0032544 A1 | 3/2002 | Reid et al. ................... 702/183 |
| 2002/0121910 A1 | 9/2002 | Rome et al. ................. 324/718 |
| 2002/0145568 A1 | 10/2002 | Winter ........................ 343/701 |
| 2002/0148644 A1 | 10/2002 | Schultz et al. ................ 175/39 |
| 2003/0033040 A1 | 2/2003 | Billings ....................... 700/97 |
| 2003/0045962 A1 | 3/2003 | Eryurek et al. ............. 700/128 |

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 487 419 A2 | 5/1992 |
| EP | 0 512 794 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 A | 4/1998 |
| GB | 2 342 453 A | 4/2000 |
| GB | 2 347 232 A | 8/2000 |
| JP | 57196619 | 2/1982 |
| JP | 58-129316 | 8/1983 |
| JP | 59-116811 | 7/1984 |
| JP | 59-163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 64-01914 | 1/1989 |

| | | |
|---|---|---|
| JP | 64-72699 | 3/1989 |
| JP | 2-05105 | 1/1990 |
| JP | 3-229124 | 10/1991 |
| JP | 5-122768 | 5/1993 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/77766 | 10/2001 |
| WO | WO 02/27418 | 4/2002 |

OTHER PUBLICATIONS

U. S. Appl. No. 09/169,873, filed Oct. 12, 1998, Eryurek et al.
U. S. Appl. No. 09/175,832, filed Oct. 19, 1998, Eryurek et al.
U. S. Appl. No. 09/257,896, filed Feb. 25, 1999, Eryurek et al.
U. S. Appl. No. 09/303,869, filed May 3, 1999, Eryurek et al.
U. S. Appl. No. 09/335,212, filed Jun. 17, 1999, Kirkpatrick et al.
U. S. Appl. No. 09/344,631, filed Jun. 25, 1999, Eryurek et al.
U. S. Appl. No. 09/360,473, filed Jul. 23, 1999, Eryurek et al.
U. S. Appl. No. 09/369,530, filed Aug. 6, 1999, Eryurek et al.
U. S. Appl. No. 09/383,828, filed Aug. 27, 1999, Eryurek et al.
U. S. Appl. No. 09/384,876, filed Aug. 27, 1999, Eryurek et al.
U. S. Appl. No. 09/406,263, filed Sep. 24, 1999, Kirkpatrick et al.
U. S. Appl. No. 09/409,098, filed Sep. 30, 1999, Eryurek et al.
U. S. Appl. No. 09/409,114, filed Sep. 30, 1999, Eryurek et al.
U. S. Appl. No. 09/565,604, filed May 4, 2000, Eryurek et al.
U. S. Appl. No. 09/576,450, filed May 23, 2000, Wehrs.
U. S. Appl. No. 09/606,259, filed Jun. 29, 2000, Eryurek.
U. S. Appl. No. 09/616,118, filed Jul. 14, 2000, Eryurek et al.
U. S. Appl. No. 09/627,543, filed Jul. 28, 2000, Eryurek et al.
U. S. Appl. No. 09/576,719, filed May 23, 2000, Coursolle et al.
U. S. Appl. No. 09/799,824, filed Mar. 5, 2001, Rome et al.
U. S. Appl. No. 09/855,179, filed May 14, 2001, Eryurek et al.
U. S. Appl. No. 09/852,102, filed May 9, 2001, Eryurek et al.
"A TCP/IP Tutorial" by, Socolofsky et al., Spider Systems Limited, Jan. 1991 pp. 1-23.
"Approval Standards For Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies, Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specification, ISA-S50.02-1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol -- HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI And Browser For Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simul.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network,"*IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M. P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B. R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600°C", by M.J. de Groot et al., *CAL LAB*, Jul./Aug. 1996, pp. 38-41.

"Survey, Applications, And Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R. L. Shepard et al., Apr. 1992.

"Tuned-Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1] ," D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnositics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).
"Fuzzy Logic and Artificial Neural Networks for Nuclear Power Plant Applications," by R.C. Berkan et al., *Proceedings of the American Power Conference*.
"Fuzzy Logic and Neural Network Applications to Fault Diagnosis", by P. Frank et al., *International Journal of Approximate Reasoning*, (1997), pp. 68-88.
"Keynote Paper: Hardware Compilation—A New Technique for Rapid Prototyping of Digital Systems-Applied to Sensor Validation", by M.P. Henry, *Control Eng. Practice*, vol. 3, No. 7., pp. 907-924, (1995).
"The Implications of Digital Communications on Sensor Validation", by M. Henry et al., *Report No. QUEL 1912/92*, (1992).
"In-Situ Response Time Testing of Thermocouples", *ISA*, by H.M. Hashemian et al., Paper No. 89-0056, pp. 587-593, (1989).
"An Integrated Architecture For Signal Validation in Power Plants," by B.R. Upadhyaya et al., *Third IEEE International Symposium on Intelligent Control*, Aug. 24-26, 1988, pp. 1-6.
"Integration of Multiple Signal Validation Modules for Sensor Monitoring," by B. Upadhyaya et al., *Department of Nuclear Engineering*, Jul. 8, 1990, pp. 1-6.
"Intelligent Behaviour for Self-Validating Sensors", by M.P. Henry, *Advances In Measurement*, pp. 1-7, (May 1990).
"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.
"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.
"Neural Networks for Sensor Validation and Plant Monitoring," by B. Upadhyaya, *International Fast Reactor Safety Meeting*, Aug. 12-16, 1990, pp. 2-10.
"Neural Networks for Sensor Validation and Plantwide Monitoring," by E. Eryurek, 1992.
"A New Method of Johnson Noise Thermometry", by C.J. Borkowski et al., *Rev. Sci. Instrum.*, vol. 45, No. 2, (Feb. 1974) pp. 151-162.
"Thermocouple Continuity Checker," IBM Technical Disclosure Bulletin, vol. 20, No. 5, pp. 1954 (Oct. 1977).
"A Self-Validating Thermocouple," Janice C-Y et al., IEEE Transactions on Control Systems Technology, vol. 5, No. 2, pp. 239-53 (Mar. 1997).
*Instrument Engineers' Handbook*, Chapter IV entitled "Temperature Measurements," by T.J. Claggett, pp. 266-333 (1982).
"emWare's Releases EMIT 3.0, Allowing Manufacturers to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, Rosemount, Inc. (1997).
Warrior, J., "The Collision Between the Web and Plant Floor Automation," 6[Th]. WWW Conference Workshop on Embedded Web Technology, Santa Clara, CA (Apr. 7, 1997).
Microsoft Press Computer Dictionary, 3rd Edition, p. 124.
"Internal Statistical Quality Control for Quality Monitoring Instruments", by P. Girling et al., *ISA*, 15 pgs., 1999.
Web Pages from www.triant.com (3 pgs.).

"Statistical Process Control (Practice Guide Series Book)", *Instrument Society of America*, 1995, pp. 1-58 and 169-204.
"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).
"Transient Pressure Signals in Mechanical Heart Valve Caviation," by Z.J. Wu et al., pp. M555-M561 (undated).
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering 1994*, by Laura A. Garrision et al., BED-vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).
"Developing Predictive Models for Cavitation Erosion," *Codes and Standards in A Global Environment*, PVP-vol. 259, pp. 189-192 (1993).
"Self-Diagnosing Intelligent Motores: A Key Enabler for Next Generation Manufacturing System," by Fred M. Discenzo et al., pp. 3/1-3/4 (1999).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP, " by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di camp," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schrödoer, pp. 557-565 (1990).
"Fault Diagnosis of Fieldbus Systems," by Jürgen Quade, pp. 577-581 (Oct. 1992).
"Ziele und Anwendungen von Feldbussystemen," by T. Pfeifer et al., pp. 549-557 (Oct. 1987).
"PROFIBUS Infrastructure Measures," by Tilo Pfeifer et al., pp. 416-419 (Aug. 1991).
"Simulation the Time Behaviour of Fieldbus Systems," by O. Schnelle, pp. 440-442 (1991).
"Modélisation et simulation d'un bus de terrain: FIP," by Song et al, pp. 5-9 (undated).
"Field Bus Networks for Automation Systems Containing Intelligent Functional Unites," by W. Kriesel et al., pp. 486-489 (1987).
"Field Buses for Process Interconnection with Digital Control Systems," Tecnologia, pp. 141-147 (1990).
"Decentralised Systems with Real-Time Field Bus," Netzwerke, Jg. Nr.3 v. 14.3, 4 pages (1990).
"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

Copy of International Search Report from Application Number PCT/US01/40791 with international filing date of May 22, 2001.

Copy of International Search Report from Application Number PCT/US01/40782 with international filing date of May 22, 2001.

Copy of International Search Report from Application Number PCT/02/14560 with international filing date of May 8, 2002.

Copy of International Search Report from Application Number PCT/US0214934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

Copy of International Search Report from Application Number PCT/US02/06606 with international filing date of Mar. 5, 2002.

Copy of International Search Report from Application Number PCT/US02/30465 with international filing date of Sep. 25, 2002.

"What is a weighted moving average?", *DAU Stat Refresher*, http://cne.gmu.edu/modules/dau/stat/mvavgs/wma_bdy.html, (1995).

"Notification of Transmittal of The International Search Report and Written Opinion of the International Searching Authority, or the Declaration", PCT/US2005/011385.

"Notification of Transmittal of the International Search Report and the Written Opinion of the International Searching Authority", or the Declaration for PCT/US2004/017300.

"Notification of Transmittal of The International Search Report or the Declaration", PCT/US2004/025291.

"Invitation to Pay.Additional Fees and Annex to Form PCT/ISA/206.".

* cited by examiner

PROCESS DEVICE DIAGNOSTICS USING PROCESS VARIABLE SENSOR SIGNAL

The present application is a Continuation-In-Part of and claims priority of U.S. patent application Ser. No. 09/344,631, filed Jun. 25, 1999 now U.S. Pat. No. 6,601,005, the content of which is hereby incorporated by reference in its entirety.

BACKGROUND OF THE INVENTION

The present invention relates to diagnostics of process devices (for use with industrial processes). More specifically, the invention relates to diagnostics of processes using a process variable sensor signal.

Process control devices are used in industrial process control systems to control a process. A control device is a field device which is used to control the process and includes pumps, valves, actuators, solenoids, motors, mixers, agitators, breaker, crusher, roller, mill, ball mill, kneader, blender, filter, cyclone, centrifuge, tower, dryer, conveyor, separator, elevator, hoist, heater, cooler or others. A valve controller includes a valve actuator coupled to a valve used to control flow of process fluid. A pump controller includes a motor controller or actuator coupled to a pump. Diagnostics of process control devices can be used to identify a failed control device or predict an impending failure.

Sensing vibrations is one method used to diagnose process control devices. A vibration sensor such as an accelerometer placed directly on a control device can be used to sense vibration noise signals generated by the device. Vibrations are isolated and evaluated by identifying those which exceed an amplitude threshold or which have an abnormal frequency which are indicative of an actual or impending failure. For example, sensors are placed on pump or motor housings, discharge valves, or flanges associated with the control device. Another known diagnostic method is a manual inspection in which an operator listens for abnormal sounds from the control device.

These known methods rely on sensing vibrations at the process control device. The automated diagnostic techniques require additional sensors and circuitry to be included in the control device. There is thus a need for improved diagnostic technology which does not rely on additional components in the control device or the inaccurate and time consuming manual inspection of the prior art to isolate and evaluate vibration noise signals.

SUMMARY OF THE INVENTION

A diagnostic device for use in a process control system includes a sensor signal input related to a process variable of a process fluid of a process. A signal preprocessor provides sensor power signal output as a function of a frequency distribution of power in the sensor signal. A signal evaluator outputs a condition related to a condition of the process. A diagnostic method is also provided.

DETAILED DESCRIPTION OF THE PREFERRED EMBODIMENTS

Figure 1:
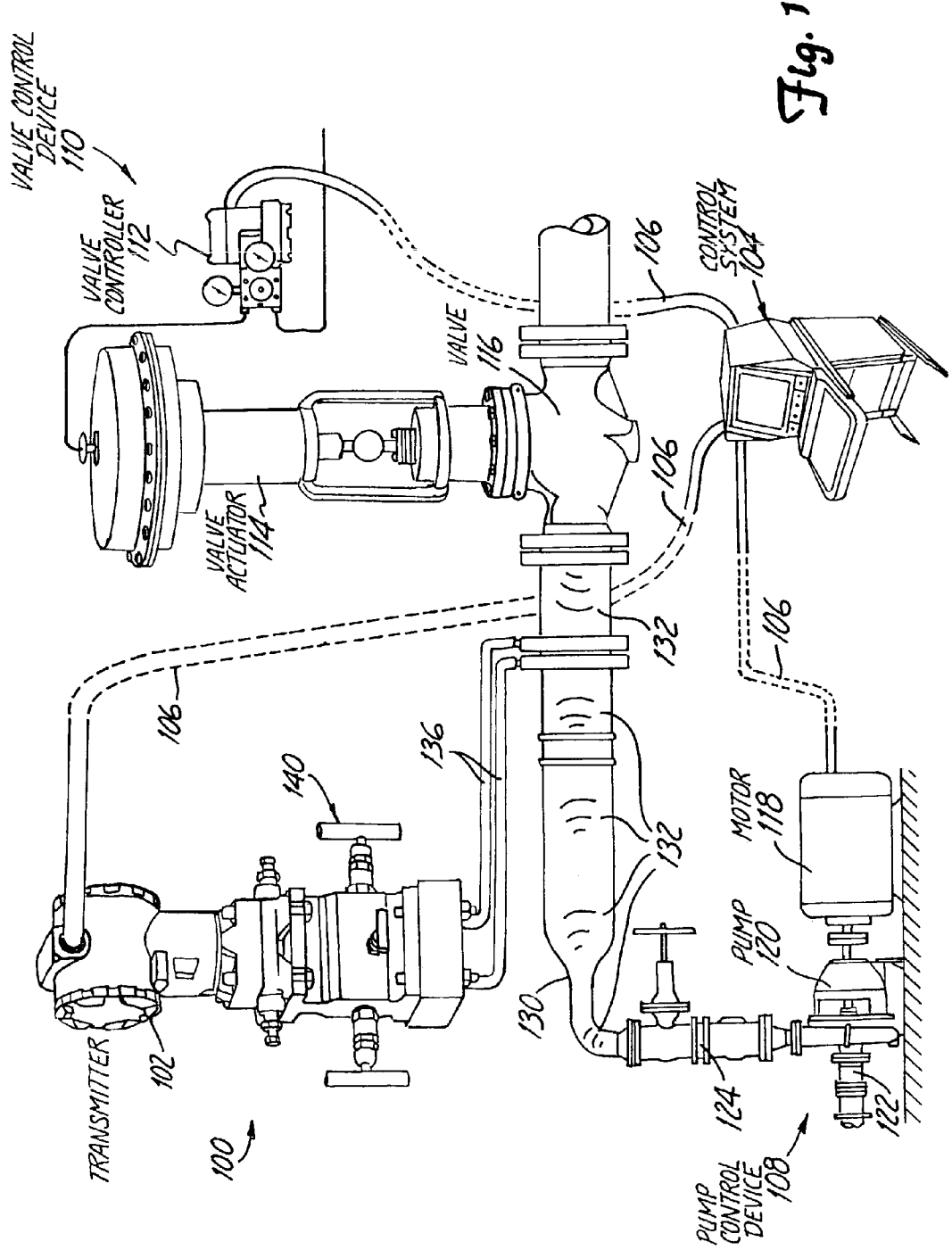
FIG. 1 is an illustration of a typical fluid processing environment for the diagnostic device.

In FIG. 1, a typical environment for a diagnostic device in accordance with one embodiment of the invention is illustrated at 100. In FIG. 1, a diagnostic device, such as process transmitter 102 configured as a pressure transmitter, is shown connected to control system 104. Process transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, flow, level, temperature or other properties of fluids. A vibration sensitive process variable sensor is one that can sense vibrations carried in the process fluid, such as a pressure sensor, a sensor in a coriolis flow meter, electrodes in a magnetic flow meter, a sensor in a vortex or ultrasonic flowmeter or others. Process transmitters include one or more sensors that can be either internal to the transmitter or external to the transmitter, depending on the installation needs at the process plant. Process transmitters generate one or more transmitter outputs that represent a sensed process variable or can also monitor the process using data received from remote sensors. Transmitter outputs are configured for transmission over long distance to a controller or indicator via communication bus 106. In typical fluid processing plants, communication bus 106 can be a 4–20 mA current loop that powers the transmitter, or a fieldbus connection, a HART® protocol communication or a fiberoptic connection to a controller, a control system or an output device. In transmitters powered by a two wire loop, power must be kept low to provide intrinsic safety in explosive atmospheres. Other types of communication busses can also be used such as either net operating with other protocols such as tcp/ip.

In FIG. 1, pump control device 108 and valve control device 110 are illustrated as examples of control devices and vibration noise sources. Control devices are actuated by control system 104 using communication bus 106 to control the process fluid. System 104 can be a maintenance computer, an enterprise planning or monitoring system or a computerized maintenance measurement system or a process control system. Control devices are also typically vibration noise sources. However, a vibration noise source is any element in a process which generates vibrations which are carried by process fluid. Vibration noise signals are any vibration signal generated by a control device or which are generated by process fluid moving through the process system, such as vibrations due to cavitation or other flow or process related noise. Valve control device 110 includes a valve controller 112 which controls a supply of pressurized air to valve actuator 114 which in turn actuates valve 116. Pump control device includes motor 118 which actuates pump 120 to move process fluid through suction flange pipeline 122 and out discharge valve 124. Control devices and transmitters all couple to process piping 130 which carries process fluid. Vibration noise signals 132 generated by the process such as by operation of control devices, propagate through the process fluid and are sensed by a process variable sensor.

Figure 2:
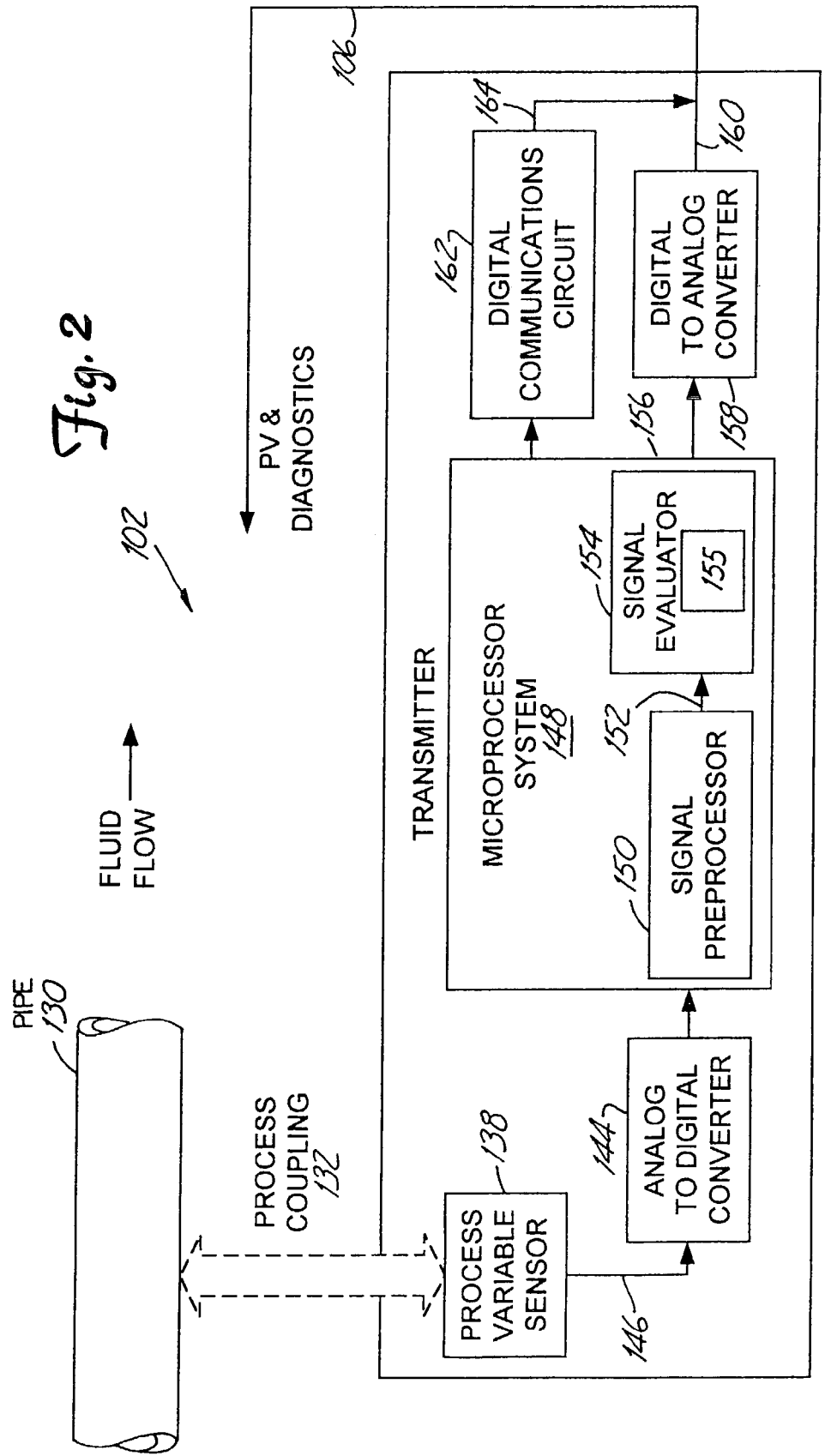
FIG. 2 is a block diagram of a differential pressure fluid flowmeter that diagnoses a condition of the process.

In FIG. 2, a block diagram shows one embodiment of a transmitter 102 configured as a diagnostic device in accordance with the invention. Examples of other diagnostic devices include control system 104, magnetic flowmeter 250 (FIG. 7), vortex flowmeter 260 (FIG. 8) and coriolis flowmeter 330 (FIG. 9). Transmitter 102 senses a process variable of process fluid in pipe 130 with process variable sensor 138. Transmitter 102 includes a process coupling 132 which couples a process variable sensor 138 to process fluid in pipe 130. For example, coupling 132 can comprise impulse lines 136 and flange 140 for transmitter 102, flow tube 252 for magnetic flowmeter 250, flow tube 264 and shedding bar 262 for vortex flowmeter 260, or flow tube 332 and measurement tubes 336 for coriolis flowmeter 330. Examples of process variable sensors 138 include a pressure sensor, electrodes 258 (FIG. 7), sensor 266 (FIG. 8), and coils 342 (FIG. 9). Analog to digital converter 144 receives sensor input 146 from process variable sensor 138 which is related to a process variable of the process fluid. Analog to digital converter 144 provides a digitized sensor signal to microprocessor system 148.

Microprocessor system 148 includes signal preprocessor 150 which is coupled to sensor input 146 through analog to digital converter 144 and isolates signal components in the sensor signal such as frequencies, amplitudes or signal characteristics which are related to operation of the process. Signal preprocessor 150 provides an isolated signal output 152 to signal evaluator 154. Signal preprocessor isolates a portion of the process variable signal by filtering, performing a wavelet transform, performing a Fourier transform, use of a neural network, statistical analysis, or other signal evaluation techniques. The isolated signal output is related to vibration noise signals 132 in the process fluid sensed by sensor 138. Signal evaluator 154 includes memory 155 and provides a condition output 156 which is related to a condition of the process. Signal evaluator 154 evaluates the isolated signal output 152 based upon a rule, fuzzy logic, a neural network, an expert system, a wavelet analysis or other signal evaluation technique. Process conditions include condition, diagnostic, health, or time to failure information related to valves, pumps, pump seals, discharge systems, actuators, solenoids, compressors, turbines, agitators, dampers, piping, fixtures, tanks, or other components of a process control system. Signal preprocessor 150 and signal evaluator 154 isolate and evaluate sensor signal components as shown in flow chart 200 of FIG. 6.

Microprocessor system 148 further calculates a process variable based upon the sensor signal input 146 in accordance with known techniques. A digital to analog converter 158 coupled to microprocessor system 148 generates an analog transmitter output 160 for coupling to communication bus 106. A digital communication circuit 162 generates a transmitter output 164. The analog output 160 and the diagnostic data 164 can be coupled to indicators or controllers as desired.

Figure 3:
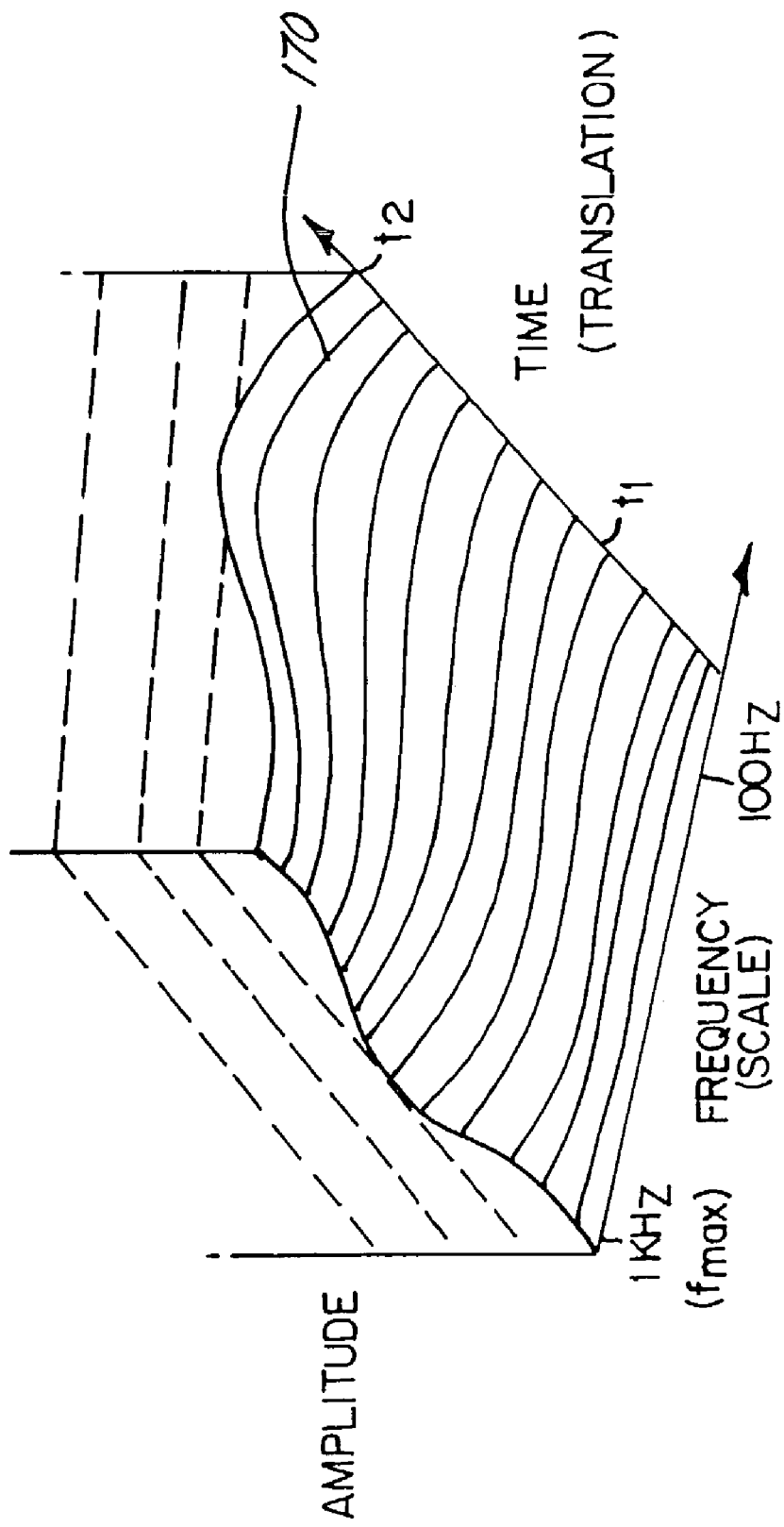
FIG. 3 is a graph of amplitude versus frequency versus time of a process variable signal.
Figure 4:
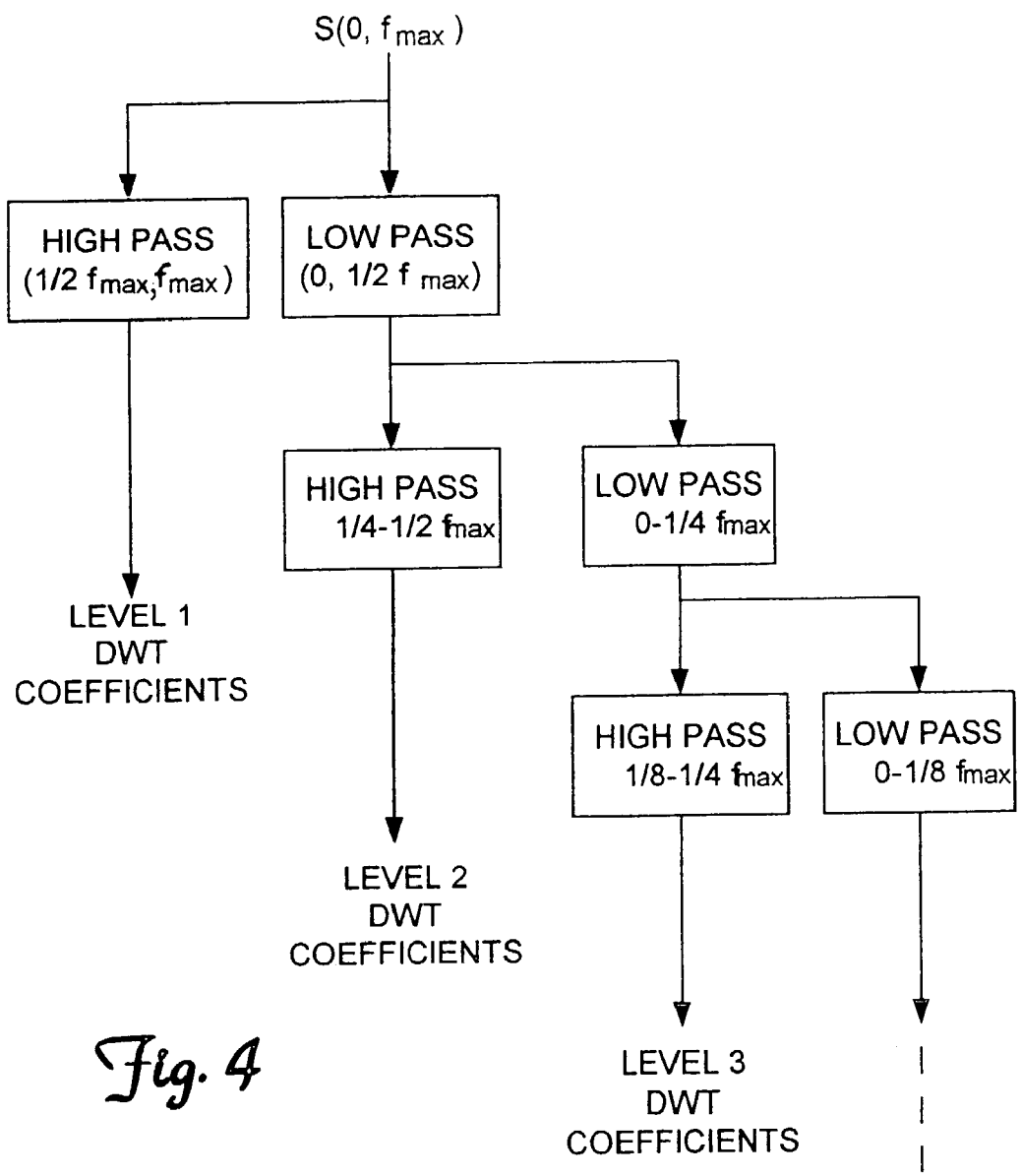
FIG. 4 is a block diagram of a discrete wavelet transformation.
Figure 5:
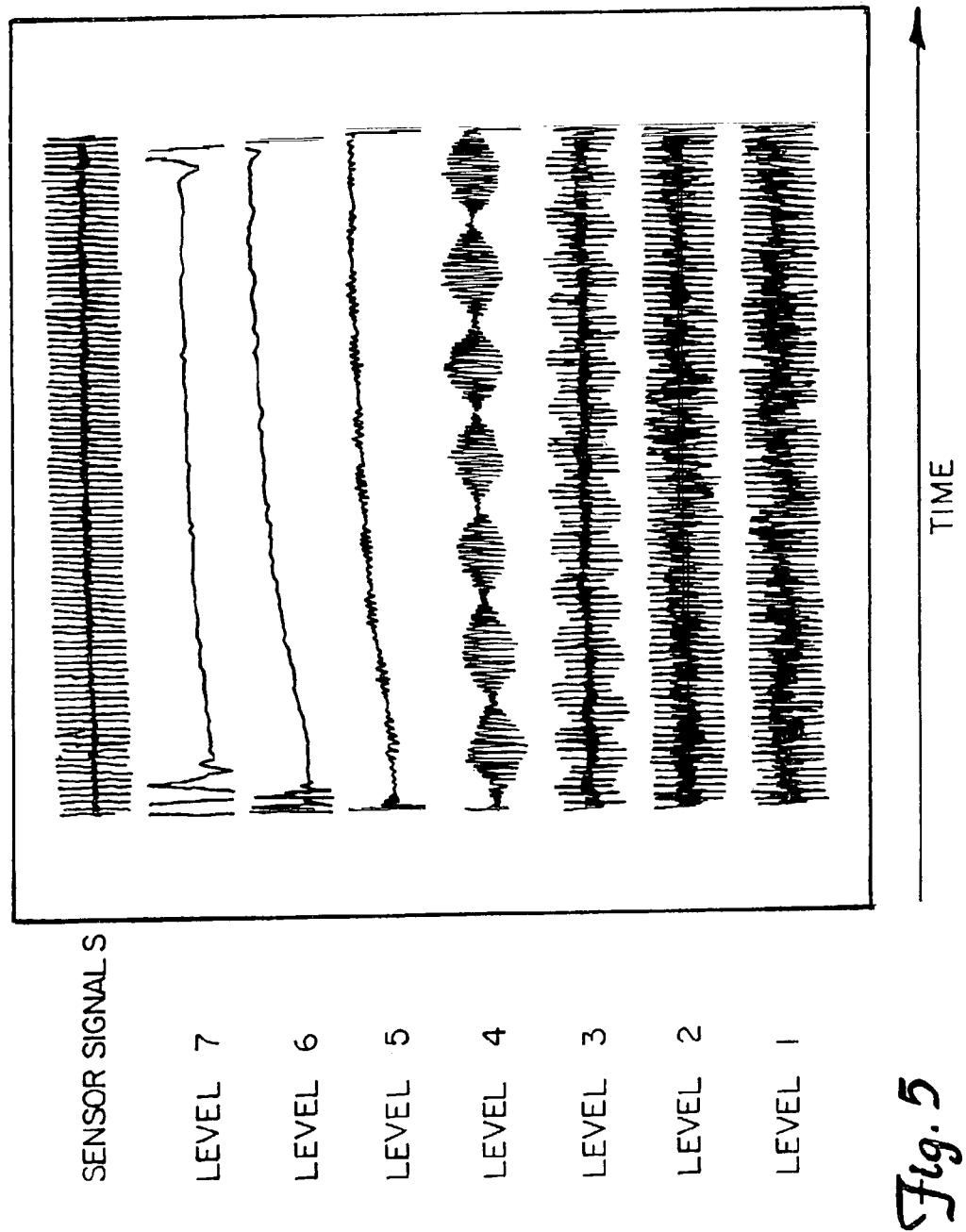
FIG. 5 is a graph showing signals output from a discrete wavelet transformation.

Signal preprocessor 150 is configured to isolate signal components which are related to vibration noise signals 132 in the process fluid. The signal components are isolated through signal processing techniques in which only desired frequencies or other signal characteristics such as amplitude are identified and an indication of their identification is provided on an isolated signal output 152. Depending upon the strength of noise signals 132 and their frequency, signal preprocessor can comprise a filter, for example a band pass filter, to generate the isolated signal output 152. For more sensitive isolation, advanced signal processing techniques are utilized such as a Fast Fourier transform (FFT) to obtain the spectrum of the sensor signal. In one preferred embodiment, signal preprocessor 150 comprises a wavelet processor which performs a wavelet analysis on the sensor signal as shown in FIGS. 3, 4 and 5 using a discrete wavelet transform. Wavelet analysis is well suited for analyzing signals which have transients or other non-stationary characteristics in the time domain. In contrast to Fourier transforms, wavelet analysis retains information in the time domain, i.e., when the event occurred.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., 8 JOURNAL OF INTELLIGENT MANUFACTURING pgs. 271–276 (1997). In performing a continuous wavelet transformation, a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated.

Data from a wavelet transformation of a sensor signal from process variable sensor 138 is shown in FIG. 3. The data is graphed in three dimensions and forms a surface 170. As shown in the graph of FIG. 3, the sensor signal includes a small signal peak at about 1 kHz at time $t_1$ and another peak at about 100 Hz at time $t_2$ due to vibration noise signal 132. Through subsequent processing by signal evaluator 154, surface 170 or portions of surface 170 are evaluated to provide condition output 156.

The continuous wavelet transformation described above requires extensive computations. Therefore, in one embodiment, signal preprocessor 150 performs a discrete wavelet transform (DWT) which is well suited for implementation in microprocessor system 148. One efficient discrete wavelet transform uses the Mallat algorithm which is a two channel sub-band coder. The Mallet algorithm provides a series of separated or decomposed signals which are representative of individual frequency components of the original signal. FIG. 4 shows an example of such a system in which an original sensor signal S is decomposed using a sub-band coder of a Mallet algorithm. The signal S has a frequency range from 0 to a maximum of $f_{MAX}$. The signal is passed simultaneously through a first high pass filter having a frequency range from ½ $f_{max}$ to $f_{max}$, and a low pass filter having a frequency range from 0 to ½ $f_{MAX}$. This process is called decomposition. The output from the high pass filter provides "level 1" discrete wavelet transform coefficients. The level 1 coefficients represent the amplitude as a function of time of that portion of the input signal which is between ½ $f_{max}$ and $f_{MAX}$. The output from the 0–½ $f_{max}$ low pass filter is passed through subsequent high pass (¼ $f_{max}$–½ $f_{max}$) and low pass (0–¼ $f_{max}$) filters, as desired, to provide additional levels (beyond "level 1") of discrete wavelet transform coefficients. The outputs from each low pass filter can be subjected to further decompositions offering additional levels of discrete wavelet transformation coefficients as desired. This process continues until the desired resolution is achieved or the number of remaining data samples after a decomposition yields no additional information. The resolution of the wavelet transform is chosen to be approximately the same as the sensor or the same as the minimum signal resolution required to monitor the vibration noise signal 132. Each level of DWT coefficients is representative of signal amplitude as a function of time for a given frequency range. Coefficients for each frequency range are concatenated to form a graph such as that shown in FIG. 3.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 25% beyond the active data window.

FIG. 5 is an example showing a signal S generated by sensor 138 and the resultant approximation signals yielded in seven decomposition levels labeled level 1 through level 7. In this example, signal level 7 is representative of the lowest frequency DWT coefficient which can be generated. Any further decomposition yields noise. All levels, or only those levels which relate vibration noise signal 132, are provided as isolated signal 152 to signal evaluator 154. For example, depending on the particular system configuration and sensor type, levels 2, 3 and 5 can comprise the isolated signal 152 provided to signal evaluator 154.

Signal evaluator 154 evaluates the isolated signal 152 received from signal preprocessor 150 and in one embodiment, monitors an amplitude of a certain frequency or range of frequencies identified in isolated signal 152 and provides the condition output 156 if a threshold is exceeded. For example, if the isolated signal 152 comprises those components of sensor signal between 45 and 55 Hz, sensor evaluator 154 can provide condition output 156 if a threshold is exceeded indicative of a condition in the process such as a bearing failure in pump control device 108 or cavitation in valve control device 110. Signal evaluator can also comprise more advanced decision making algorithms such as fuzzy logic, neural networks, expert systems, rule based systems, etc. Commonly assigned U.S. patent application Ser. No. 08/623,569 describes various decision making systems which can be implemented in signal evaluator 154 and is incorporated herein by reference.

Figure 6A:
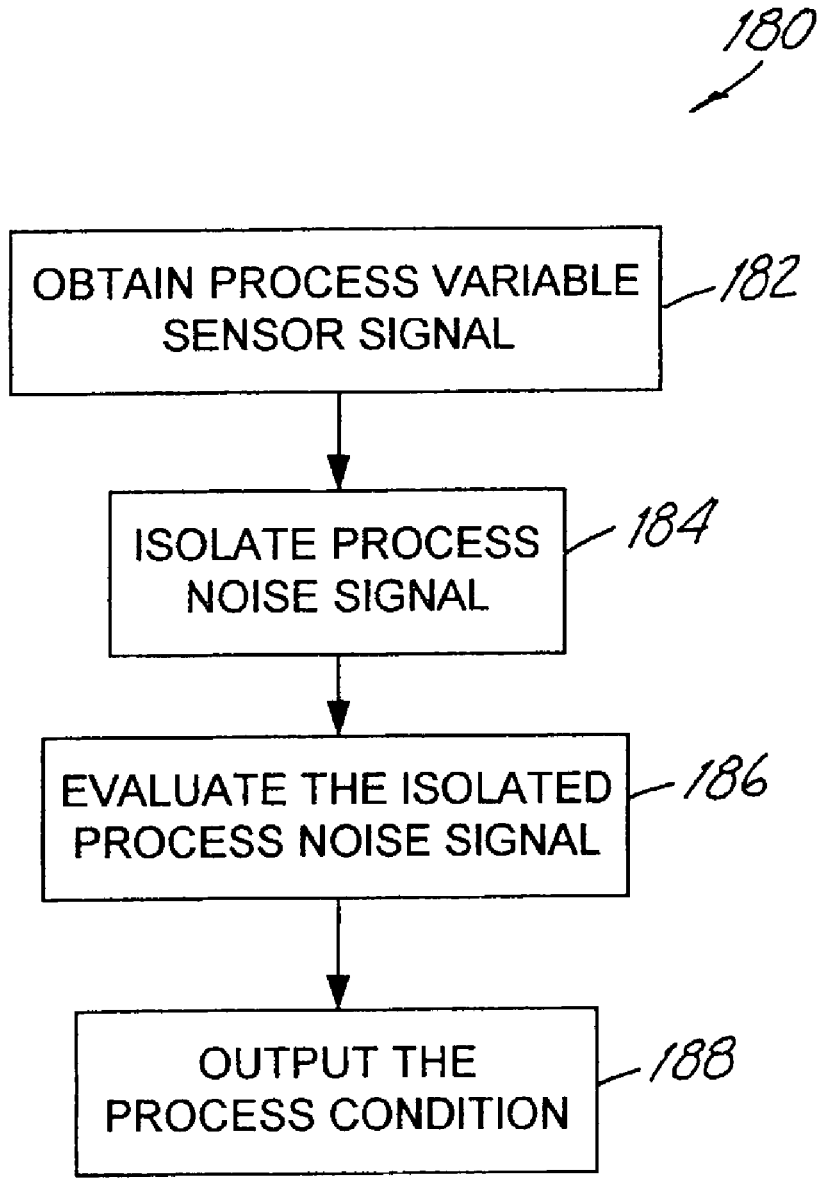
FIG. 6A is a simplified flow chart of a diagnostic device diagnosing a condition of a process.
Figure 6B:
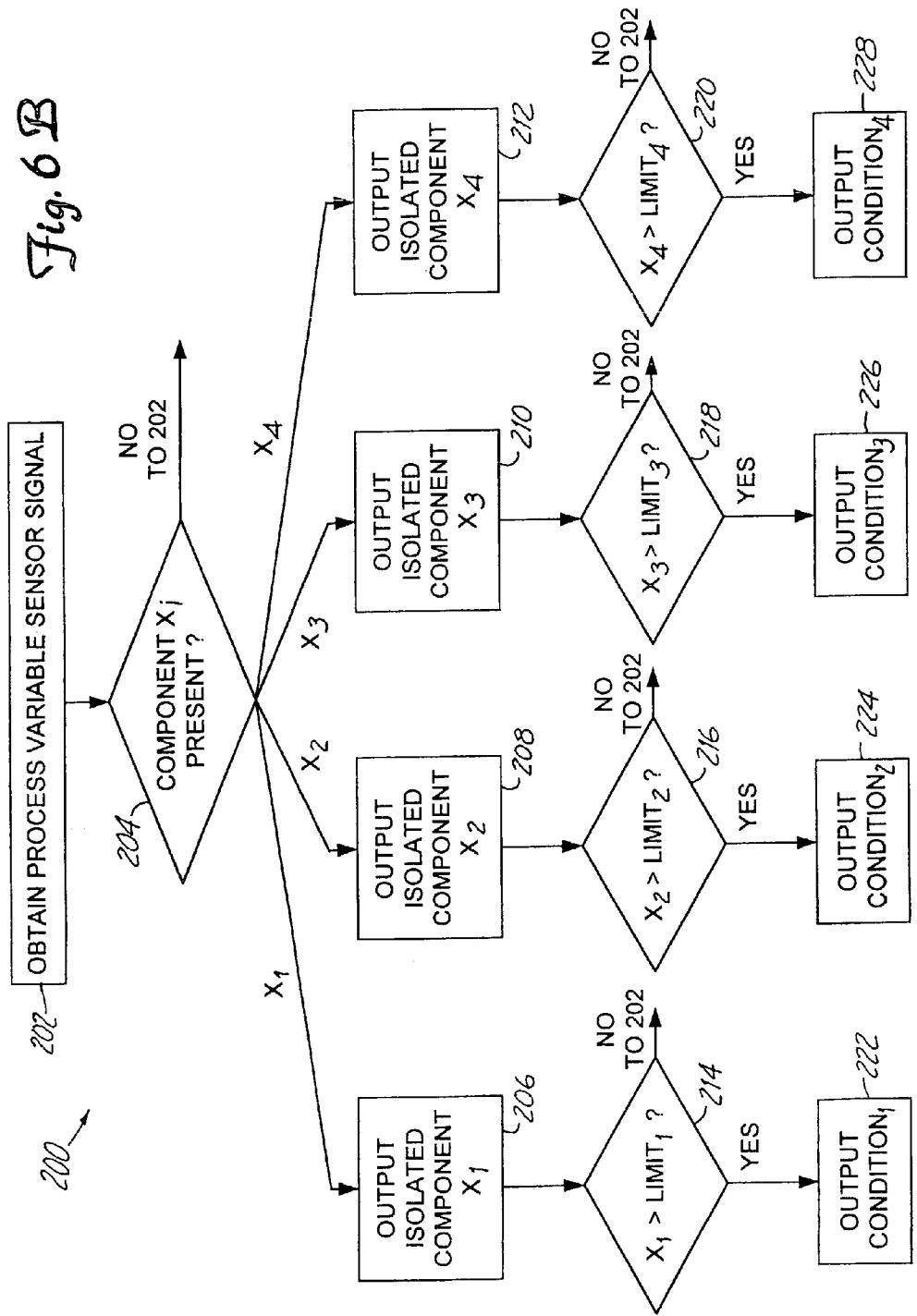
FIG. 6B is a more detailed flow chart of a diagnostic device diagnosing a condition of a process.

In FIG. 6A, a flow chart 180 of a method of diagnosis performed in a diagnostic device capable of receiving a process variable is shown. The algorithm starts at 182 and a process variable sensor signal is obtained. The process noise signal which is present in the process variable signal is isolated at 184. Next, the isolated process noise signal is evaluated at 186 and an output indicative of the process condition is provided at 188 in response to the evaluated isolated process noise signal. FIG. 6B is a more detailed flow chart 200 of the method of diagnosis. The algorithm starts at 202 and a process variable sensor signal is obtained. Components, $X_1, X_2, X_3, X_4 \ldots X_N$ are isolated at 204. (For simplicity, flow chart 200 shows only 4 components $X_1$–$X_4$). If no components $X_1$–$X_N$ are present, control is passed to block 202 and the process variable sensor signal is again obtained. At 206, 208, 210, 212 the isolated component $X_1$, $X_2, X_3, X_4$, respectively, are output. Each output is indicative of the presence of a particular signal component in the process variable sensor signal. The isolated components are evaluated at 214, 216, 218 and 220. In the signal evaluation illustrated in FIG. 6, a rule is used in which the isolated signal component is compared to a limit ($limit_1$, $limit_2$, $limit_3$, $limit_4$, respectively). If none of the limits have been exceeded by the respective isolated signal, the algorithm returns to 202 to obtain an updated process variable signal. If any limit has been exceeded, the algorithm proceeds to output $condition_1$, $condition_2$, $condition_3$, or $condition_4$ at 222, 224, 226 or 228, respectively. For example, component $X_2$ can comprise signal components of the process variable sensor signal between 45 and 55 Hz. If these components have a signal strength which is greater than a limit specified by $limit_2$, $condition_2$ is output which can indicate that a pump, for example, in the process is failing. Similarly, other components in the sensor signal indicate the condition of other aspects of the process control system. If a single component is indicative of a condition of more than one aspect of the process, the output indicates that there are two possible conditions in the process. Further, the condition output is not necessarily tied to a specific failure and can simply indicate that a particular signal component has exceeded a threshold or has some other characteristic. In general, steps 202–212 are performed by signal preprocessor 150 of FIG. 2 and steps 214–226 are performed by signal evaluator 154. However, the steps of isolating and evaluating can be combined and performed simultaneously or by the same components in a diagnostic device.

In process control systems where there is a known process variation, for example, due to certain process activities, the variation can be modeled and thereby removed from the process variable signal to obtain the isolated sensor signal. In one aspect, wavelet transformation data is calculated and stored in memory 155 of signal evaluator 154 shown in FIG. 2 during normal operation of the process. This data represents a base "plane" of normal operation. The data can be collected at various times during the day, during a process cycle and during the year. When placed into normal use, signal evaluator 154 retrieves the stored wavelet transformation from memory 155 and compares the base plane data with information gathered through wavelet analysis during operation. For example, if signal evaluator 154 subtracts the base plane data from a current wavelet transformation, the resultant data represents only the anomalies occurring in the process. Such a subtraction process separates the process variations from abnormal vibration noise signals along with daily and seasonal variations in the signal. For example, the vibration sensor signal 146 may change during the day or over the course of a year due to environmental temperature changes and process activities. This separates the process signal from the vibration noise signal 132. During operation, a neural network can operate in microprocessor system 148 to monitor operation of the process and select the optimum model stored in memory 155. Coefficients related to operation of the model can be generated using a neural network or can be received over communication bus 106 during installation of transmitter 102 as provided for in various communication protocols. Examples of models include a first order model including dead time which is typically good for non-oscillatory systems, or second order models plus dead time which typically suffice for oscillatory processes. Another modeling technique is to use an adaptive neural network-fuzzy logic model. Such a hybrid system includes a neural network and fuzzy logic. The fuzzy logic adapts the model to variability of the process while the neural network models allow flexibility of the modeling to thereby adjust to changing processes. This provides a relatively robust model. The use of adaptive membership functions in the fuzzy logic model further allows the determination whether the particular model should be updated. The diagnostic device can operate with any appropriate type of signal evaluator such as one that includes life expectancy or diagnostic circuitry. Examples of such techniques are shown in the co-pending application Ser. No. 08/744,980, filed Nov. 7, 1996, entitled "DIAGNOSTICS FOR RESISTANCE BASED TRANSMITTER," which is incorporated by reference.

Figure 7:
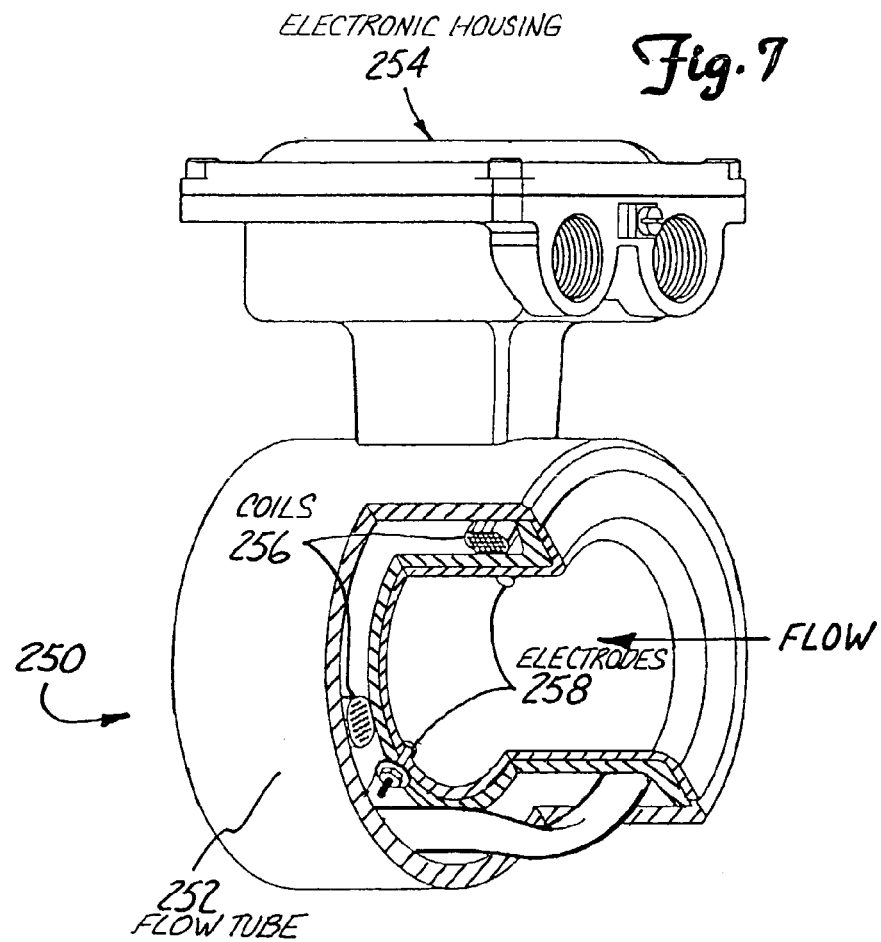
FIG. 7 illustrates a magnetic flowmeter type diagnostic device.

The process variable sensor 138 can be any type of process variable sensor which is capable of sensing vibrations in the process fluid. The process variable sensor should have a bandwidth and a frequency response or resolution sufficient to detect the desired vibration noise signals. Typically, this is between about 0 and about 200 Hz in a differential pressure based flow transmitter. One type of process variable sensor is a pressure sensor. A process variable pressure sensor having sufficient bandwidth is illustrated in U.S. Pat. No. 5,637,802, issued Jun. 10, 1997. Other components in the devices such as analog to digital converters must also have sufficient bandwidth, amplifiers and other elements in the input channel. FIG. 7 illustrates a magnetic flowmeter 250 having a process variable sensor provided by electrodes 258. Flowmeter 250 includes flow tube 252 coupled to electronics housing 254. In a magnetic flowmeter, coils 256 generate a magnetic field in flow tube 252. The flow of process fluid through the resultant magnetic field develops an electric potential between electrodes 258 which provide a process variable sensor signal. Vibration signals 132 in the fluid change the flow rate and can be sensed by electrodes 258. Typical frequency response of magnetic flowmeters are 0–75 Hz or higher.

Figure 8:
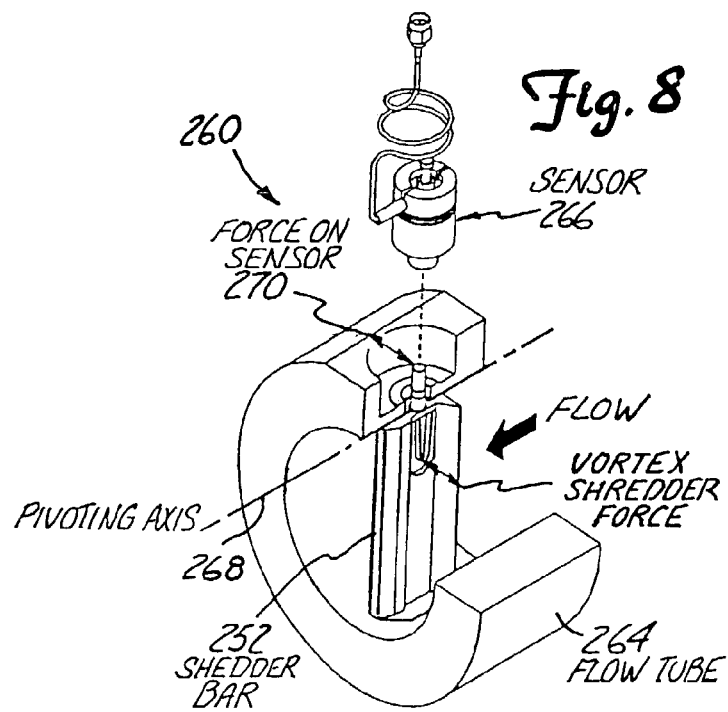
FIG. 8 illustrates a vortex flowmeter type diagnostic device.
Figure 9:
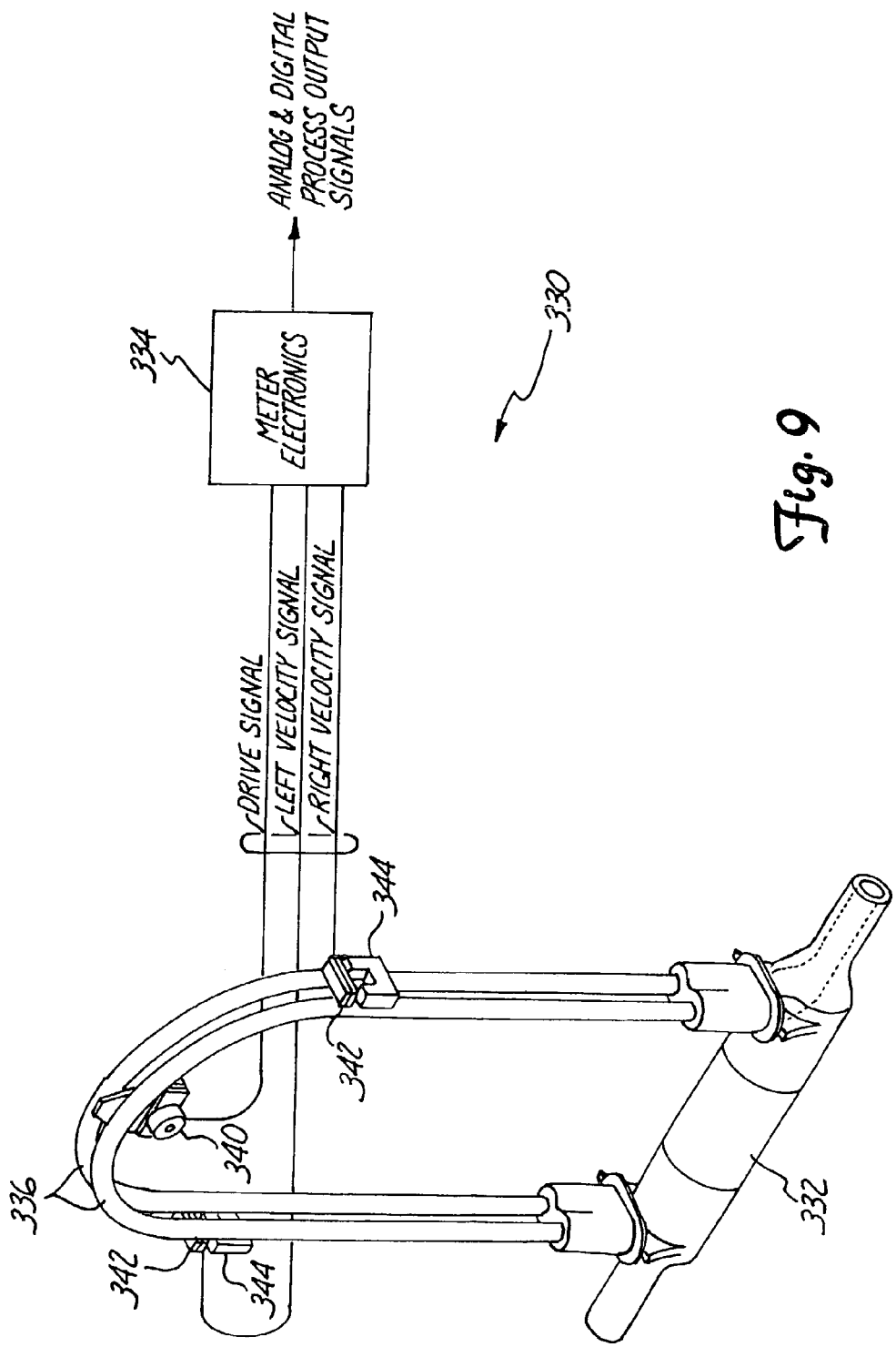
FIG. 9 illustrates a coriolis type diagnostic device.

FIG. 8 illustrates a vortex flowmeter 260 having a process variable sensor provided by sensor 266. Vortex flowmeter 260 includes a shedding bar 262 mounted in flow tube 264 and coupled to fourth sensor 266. A flow of process fluid through flow tube 264 causes shedding bar 262 to move about pivot axis 268. This movement causes a force 270 to be transferred to sensor 266 which provides a process variable sensor signal. The frequency of this force is related to the flow through flow tube 264. Noise vibration signals 132 are also transferred to sensor 266 for use with the signal preprocessor 150 and signal evaluator 154 shown in FIG. 2. Vortex flowmeters typically have a frequency response of between about 0 and 10 KHz or higher.

FIG. 9 illustrates a coriolis flowmeter 330 process variable sensor provided by coils 342 and which includes a flow tube 332 and meter electronics 334. Measurement tubes 336 coupled to flow tube 332. A drive coil 340 vibrates tubes 336 in response to a drive signal and sense elements which include sense coils 342 and sense magnets 344 provide left and right velocity signals related to the resultant vibration of tubes 336. Flow through the tubes 336 cause tubes 336 to pivot in a manner which is sensed by coils 342. The outputs from coils 342 are related to flow through tubes 336 and provide a process variable sensor signal. Vibration noise signals 132 can also be sensed by coils 342 and provided to signal preprocessor 140 shown in FIG. 2. Coriolis meters typically have a very wide frequency response which can sense vibrations at very high frequencies.

Other types of process variable sensors include an ultrasonic or radio frequency receiver in a level gauge or an ultrasonic receiver in a ultrasonic level sensor. For example, transmitter 102 can comprise an ultrasonic flowmeter or level gauge and sensor 138 is an ultrasonic sensor. Additionally, control devices such as valve controllers can include process variable sensors.

In one embodiment, the signal preprocessor 150 generates a sensor power signal 152 as a function of the frequency distribution of power of the sensor signal. For example, the signal preprocessor 150 can perform a wavelet transformation, discrete wavelet transformation, Fourier transformation, or use other techniques to determine the spectrum of the sensor signal. The power of the distributed frequencies is determined by monitoring such a converted signal over time. One example of this is the power spectral density (PSD). The power spectral density can be defined as the power (or variance) of a time series and can be described as how the power (or variance) of a time series is distributed with frequency. For example, this can be defined as the Fourier transform of an auto-correlation sequence of the time series. Another definition of power spectral density is the squared modulus of the Fourier transform of the time series, scaled by an appropriate constant term.

Power spectral density, Fi, can also be calculated using Welch's method of averaged periodograms for a given data set. The method uses a measurement sequence x(n) sampled at fs samples per second, where n=1, 2, . . N. A front end filter with a filter frequency less than fs/2 is used to reduce aliasing in the spectral calculations. The data set is divided into $F_{k,i}$ as shown in Eq. 1:

$$F_{k,i} = (1/M) \left| \sum_{n=1}^{M} x_k(n) e^{-j2\Pi i \Delta fn} \right|^2 \qquad \text{Eq. 1}$$

There are $F_{k,i}$ overlapping data segments and for each segment, a periodogram is calculated where M is the number of points in the current segment. After all periodograms for all segments are evaluated, all of them are averaged to calculate the power spectrum:

$$Fi = (1/L) \sum_{k=1}^{L} F_{k,i} \qquad \text{Eq. 2}$$

Once a power spectrum is obtained for a training mode, this sequence is stored in memory, preferably EEPROM, as the baseline power spectrum for comparison to real time power spectrums. Fi is thus the power spectrum sequence and i goes from 1 to N which is the total number of points in the original data sequence. N, usually a power of 2, also sets the frequency resolution of the spectrum estimation. Therefore, Fi is also known as the signal strength at the $i^{th}$ frequency.

The power spectrum typically includes a large number points at predefined frequency intervals, defining a shape of the spectral power distribution as a function of frequency.

The signal evaluator 154 evaluates the signal is using any appropriate techniques and including those discussed above. For example, the signal evaluator 154 can compare the frequency distribution of power in a sensor signal against a stored value, such as a stored threshold level, for example across a frequency range. Other evaluation techniques can be chosen as desired, for example, neural networks or fuzzy logic techniques can be used. The process power signal can be compared against known signal signatures, and the comparison used in performing diagnostics.

Although the invention has been described with reference to preferred embodiments, workers skilled in the art will recognize that changes can be made in form and detail without departing from the spirit and scope of the invention. The invention can be practiced in software rather than in any of a number of places in a process control system such as in a field mounted device or even a system controller. Furthermore, modern digital protocol such as fieldbus, profibus and others allow for the software which practices the invention to be communicated between elements in a process control system, and also provide for process variables to be sent in one transmitter and then sent to the software which is resident in a different piece of equipment. For example, various function blocks of the invention have been described in terms of circuitry, however, many function blocks may be implemented in other forms such as digital and analog circuits, software and their hybrids. When implemented in software, a microprocessor performs the functions and the signals comprise digital values on which the software operates. A general purpose processor programmed with instructions that cause the processor to perform the desired process elements, application specific hardware components that contain circuit wired to perform the desired elements and any combination of programming a general purpose processor and hardware components can be used. Deterministic or fuzzy logic techniques can be used as needed to make decisions in the circuitry or software. Because of the nature of complex digital circuitry, circuit elements may not be partitioned into separate blocks as shown, but components used for various functional blocks can be intermingled and shared. Likewise with software, some instructions can be shared as part of several functions and be intermingled with unrelated instructions within the scope of the invention. A diagnostic device can be any device (or a combination of devices such as devices which share information to arrive at a conclusion) which receives a process variable signal including a process monitoring system, a personal computer, a control system, a portable communicator, a controller or a transmitter. U.S. Pat. No. 5,754,596 describes a technique for transmitting stored data which has been stored in a field device such that the stored data can have a higher bandwidth than would be possible if data were transmitted at the update rate of the communication protocol. Any type of process variable sensor which is sensitive to a process noise signal can be used with the diagnostic device of the invention.

What is claimed is:

1. A diagnostic device for use in a process control system which includes a process device used to control the process, comprising:
   a sensor signal input, the sensor signal related to a process variable of a process fluid of a process, the process variable sensed by a process variable sensor;
   a signal preprocessor coupled to the sensor input having a sensor power signal output as a function of a frequency distribution of power in the sensor signal; and
   a signal evaluator coupled to the sensor power signal output having a process device condition output related to an operation condition of the process device of the process control system.

2. The diagnostic device of claim 1 wherein the diagnostic device couples to a communication bus.

3. The diagnostic device of claim 2 wherein the communication bus comprises a two-wire loop.

4. The diagnostic device of claim 3 wherein the diagnostic device is fully powered with power received from the two-wire loop.

5. The diagnostic device of claim 1 wherein the sensor signal has a frequency content of at least 50 Hz.

6. The diagnostic device of claim 1, wherein the diagnostic device is included in a transmitter.

7. The diagnostic device of claim 1 wherein the process variable sensor comprises a pressure sensor.

8. The diagnostic device of claim 1 wherein the process variable sensor comprises electrodes in a magnetic flowmeter.

9. The diagnostic device of claim 1 wherein the process variable sensor comprises a sensor in a vortex flowmeter.

10. The diagnostic device of claim 1 wherein the process variable sensor comprises a sensor in a coriolis flowmeter.

11. The diagnostic device of claim 1 wherein the signal preprocessor isolates a frequency range of the sensor signal.

12. The diagnostic device of claim 1 wherein the sensor signal has a frequency of between 0 Hz and 200 Hz.

13. The diagnostic device of claim 1 wherein the function comprises power spectral density.

14. The diagnostic device of claim 1 wherein the function is related to a Fourier transform of the sensor signal.

15. The diagnostic device of claim 1 wherein the function comprises a wavelet transform of the sensor signal.

16. The diagnostic device of claim 1 wherein the signal preprocessor includes a filter.

17. The diagnostic device of claim 1 wherein the diagnostic device is implemented in a process monitor.

18. The diagnostic device of claim 1 wherein the diagnostic device is implemented in a control system.

19. The diagnostic device of claim 1 wherein the sensor power signal output relates to a vibration noise signal carried in process fluid of the process.

20. The diagnostic device of claim 1 wherein the process variable sensor comprises a sensor in an ultrasonic flowmeter.

21. The diagnostic device of claim 1 wherein the condition of the process device condition is related to condition of a process device selected from the group of devices consisting of valves, pumps, pump seals, discharge systems, actuators, solenoids, compressors, turbines, agitators, dampers, piping, fixtures and tanks.

22. The diagnostic device of claim 1 wherein the signal evaluator compares the sensor power signal with a stored value.

23. The diagnostic device of claim 1 wherein the signal evaluator comprises a neural network.

24. The diagnostic device of claim 1 signal evaluator comprises fuzzy logic.

25. A diagnostic method performed in a process control environment which includes a process device used to control the process, the method comprising:
   obtaining a process variable sensor signal;

determining a frequency distribution of power in the process variable sensor signal; and evaluating the frequency distribution of power in the process variable sensor signal and providing a process device condition output related to an operation condition of the process device of the process control system.

26. The method of claim 25 wherein determining includes performing a Fourier transformation on the process variable sensor signal.

27. The method of claim 26 wherein determining includes performing a wavelet transformation.

28. The method of claim 27 wherein performing a wavelet transform comprises performing a discrete wavelet transform.

29. The method of claim 25 wherein determining includes filtering the process variable sensor signal.

30. The method of claim 25 wherein evaluating comprises comparing frequency distribution of power in the process variable sensor signal to a stored value.

31. The method of claim 25 wherein evaluating comprises evaluating the frequency distribution of power in the process variable sensor signal to a neural network.

32. The method of claim 25 wherein evaluating comprises applying a rule to the frequency distribution of power in the process variable sensor signal.

33. The method of claim 25 wherein the process variable sensor signal comprises a pressure sensor signal.

34. The method of claim 25 wherein the process variable sensor signal comprises a sensor output from a coriolis flowmeter.

35. The method of claim 25 wherein the process variable sensor signal comprises a sensor output from a vortex flowmeter.

36. The method of claim 25 wherein the process variable sensor signal comprises electrode outputs from a magnetic flowmeter.

37. The method of claim 25 wherein the process variable sensor signal has a bandwidth of at least 50 Hz.

38. The method of claim 25 including fully powering the diagnostic device with power from a two-wire loop.

39. The method of claim 25 wherein the frequency distribution of power in the process variable sensor signal comprises power spectral density.

40. A computer-readable medium having stored thereon instructions executable by a microprocessor system in a diagnostic device to diagnose condition of a process which includes a process device used to control the process, the instructions comprising:

obtaining a process variable sensor signal;

determining a frequency distribution of power in the process variable sensor signal; and evaluating the frequency distribution of power in the process variable sensor signal and providing a process device condition output related to an operation condition of the process device of the process control system.

41. A diagnostic device for use in a process control system which includes a process device used to control the process, comprising:

a sensor signal input, the sensor signal related to a process variable of a process fluid of a process, the process variable sensed by a process variable sensor;

signal preprocessing means for determining a frequency distribution of power in the sensor signal; and signal evaluating means for diagnosing a process device operation condition of the process device of the process control system based upon the frequency distribution of power in the sensor signal.

* * * * *